United States Patent
Steffen et al.

(10) Patent No.: US 10,119,256 B1
(45) Date of Patent: Nov. 6, 2018

(54) FLEXIBLE DRAIN LINE ASSEMBLY

(71) Applicants: Gordon P. Steffen, Weston, FL (US);
Madelyn R. Steffen, Weston, FL (US)

(72) Inventors: Gordon P. Steffen, Weston, FL (US);
Madelyn R. Steffen, Weston, FL (US)

(*) Notice: Subject to any disclaimer, the term of this patent is extended or adjusted under 35 U.S.C. 154(b) by 0 days.

(21) Appl. No.: 15/690,332

(22) Filed: Aug. 30, 2017

(51) Int. Cl.
| | |
|---|---|
| *E03C 1/12* | (2006.01) |
| *E03C 1/22* | (2006.01) |
| *F16L 43/00* | (2006.01) |
| *F16L 11/18* | (2006.01) |
| *F16L 3/00* | (2006.01) |

(52) U.S. Cl.
CPC ............... *E03C 1/22* (2013.01); *E03C 1/12* (2013.01); *F16L 11/18* (2013.01); *F16L 43/00* (2013.01); *F16L 3/00* (2013.01)

(58) Field of Classification Search
CPC .... E03C 1/22; E03C 1/12; F16L 11/18; F16L 3/00
USPC .............................................. 4/679
See application file for complete search history.

(56) References Cited

U.S. PATENT DOCUMENTS

| | | | |
|---|---|---|---|
| D231,930 S | 6/1974 | Danke | |
| 3,860,978 A | 6/1975 | Wirth | |
| 3,967,324 A | 7/1976 | Olive | |
| 4,922,554 A * | 5/1990 | Hwang | ............... E03C 1/284 137/247.49 |
| 6,311,936 B1 * | 11/2001 | Herr | ............... D06F 39/12 138/107 |
| 7,004,508 B1 * | 2/2006 | Flynn | ............... E03C 1/284 285/134.1 |
| 7,941,878 B1 | 5/2011 | Truong | |
| 8,205,804 B2 * | 6/2012 | Parker | ............... F16L 3/01 138/106 |
| 2005/0178438 A1 | 8/2005 | Renner | |
| 2011/0277232 A1 | 11/2011 | Shilo et al. | |
| 2013/0284301 A1 | 10/2013 | Chen | |

* cited by examiner

*Primary Examiner* — Huyen Le

(57) ABSTRACT

A flexible drain line assembly for seamlessly connecting a sink to a waste line includes a tube that has a first end and a second end. The first end and the second end are configured to fluidically couple to a waste line and a tailpiece of a sink, respectively. The tube is configured to drain waste water from the sink to the waste line. The tube is flexible to position the first end proximate to the waste line and the second end proximate to the tailpiece. A section of the tube that is positioned proximate to the first end is configured to be curvedly bent below the waste line. A retainer is configured to couple to the tube to fixedly position the section of the tube to defines a trap. The trap is configured to retain liquid to deter passage of gas from the waste line to the sink.

13 Claims, 2 Drawing Sheets

FLEXIBLE DRAIN LINE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to drain line assemblies and more particularly pertains to a new drain line assembly for seamlessly connecting a sink to a waste line.

BRIEF SUMMARY OF THE INVENTION

An embodiment of the disclosure meets the needs presented above by generally comprising a tube that has a first end and a second end. The first end and the second end are configured to fluidically couple to a waste line and a tailpiece of a sink, respectively. The tube is configured to drain waste water from the sink to the waste line. The tube is flexible to position the first end proximate to the waste line and the second end proximate to the tailpiece. A section of the tube that is positioned proximate to the first end is configured to be curvedly bent below the waste line. A retainer is configured to couple to the tube to fixedly position the section of the tube to defines a trap. The trap is configured to retain liquid to deter passage of gas from the waste line to the sink.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
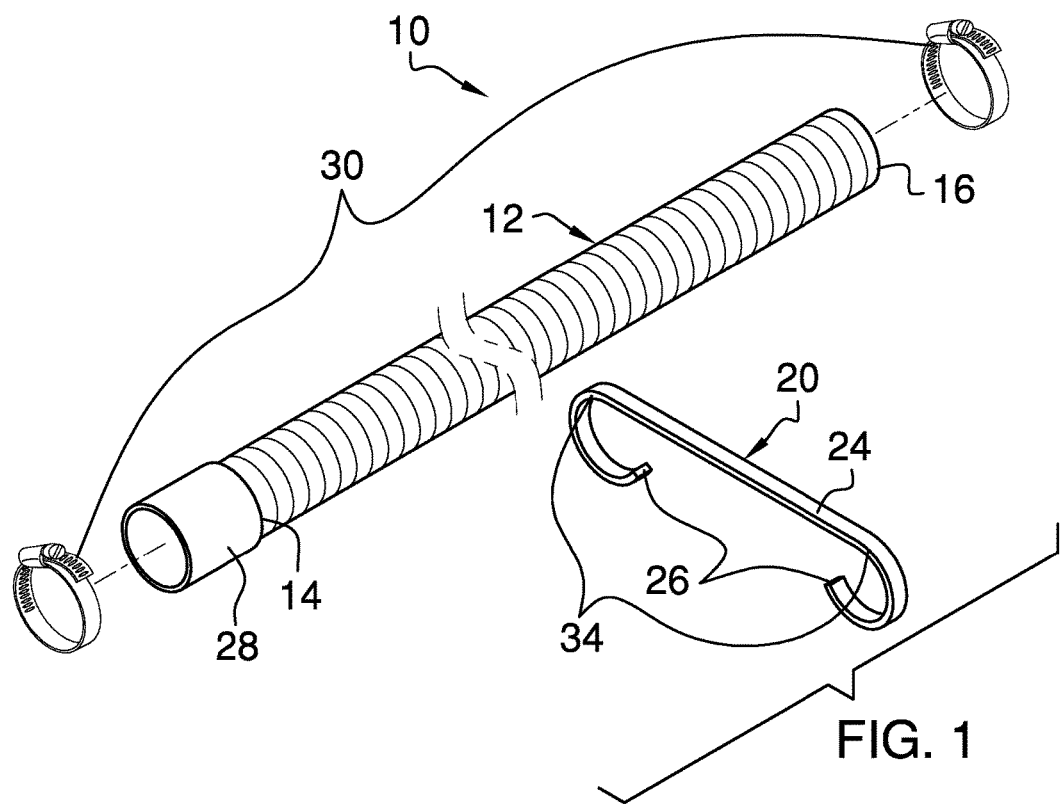
FIG. 1 is an isometric perspective view of a flexible drain line assembly according to an embodiment of the disclosure.
Figure 2:
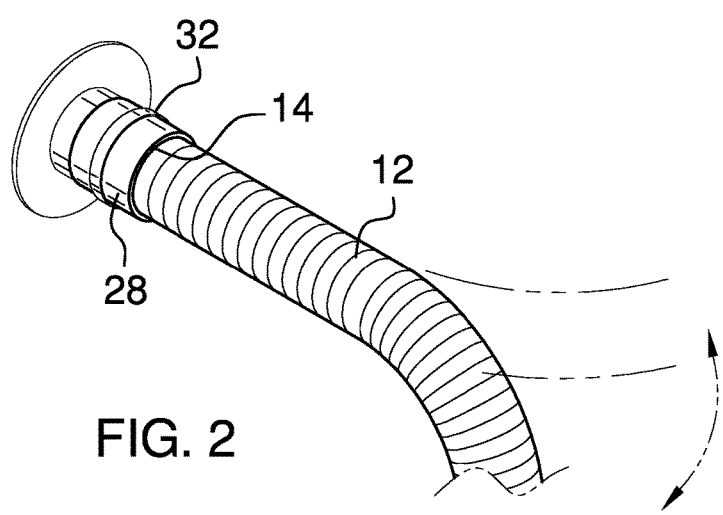
FIG. 2 is a detail view of an embodiment of the disclosure.
Figure 3:
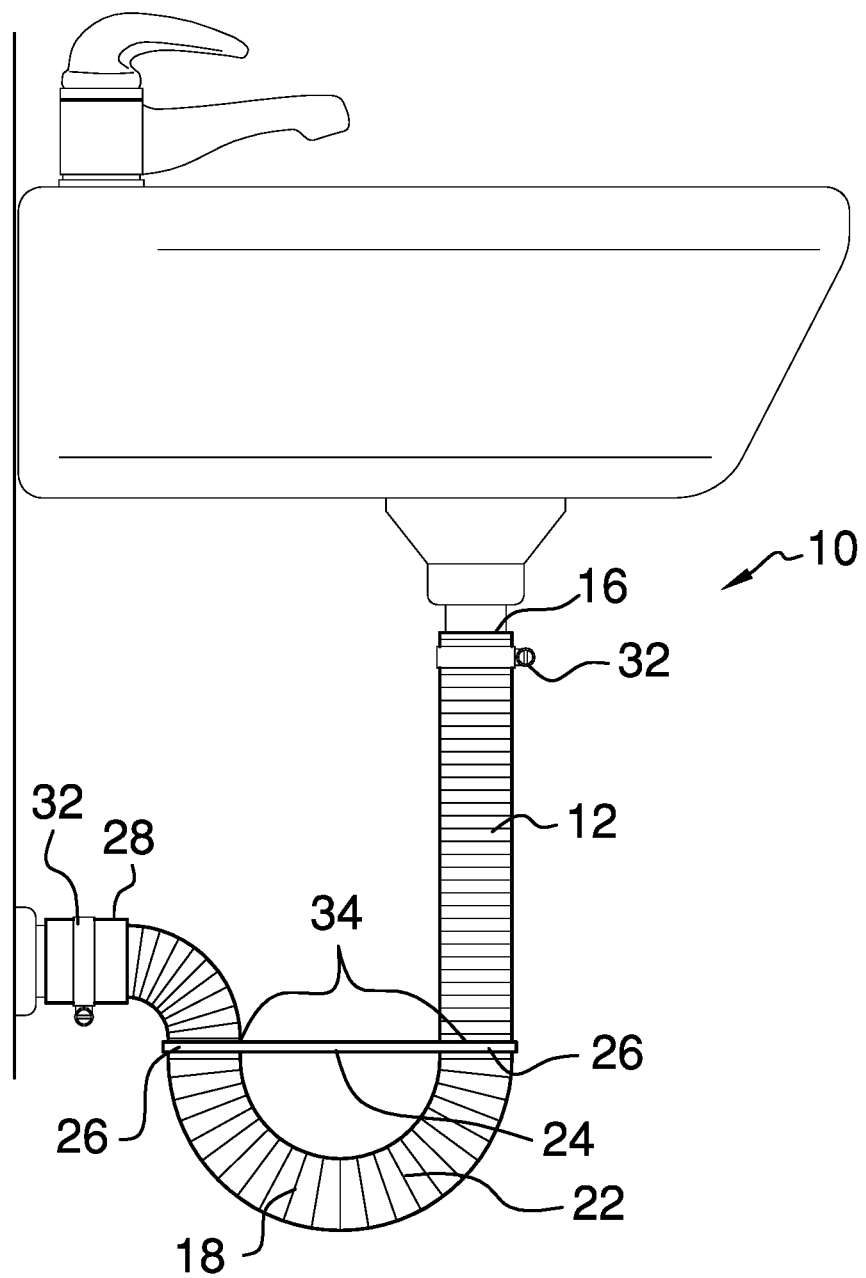
FIG. 3 is an in-use view of an embodiment of the disclosure.

With reference now to the drawings, and in particular to FIGS. 1 through 3 thereof, a new drain line assembly embodying the principles and concepts of an embodiment of the disclosure and generally designated by the reference numeral 10 will be described.

As best illustrated in FIGS. 1 through 3, the flexible drain line assembly 10 generally comprises a tube 12 that has a first end 14 and a second end 16. The first end 14 is configured to fluidically couple to a waste line. The second end 16 is configured to fluidically couple to a tailpiece of a sink. The tube 12 is configured to drain waste water from the sink to the waste line.

The tube 12 is flexible. The tube 12 is configured to be positioned with the first end 14 proximate to the waste line and the second end 16 proximate to the tailpiece. A section 18 of the tube 12 that is positioned proximate to the first end 14 is configured to be curvedly bent below the waste line. In one embodiment, the tube 12 is circularly shaped when viewed longitudinally. In another embodiment, the tube 12 comprises corrugated hose. In yet another embodiment, the tube 12 comprises plastic.

A retainer 20 is configured to couple to the tube 12 to fixedly position the section 18 of the tube 12 to define a trap 22. The trap 22 is configured to retain liquid. The liquid is positioned to deter passage of gas from the waste line through the trap 22 and the tube 12 to the sink.

In one embodiment, the trap 22 is U-shaped. In another embodiment, the retainer 20 comprises a bar 24 and a pair of hooks 26. The hooks 26 are complementary to the tube 12. Each hook 26 is coupled to and extends from a respective opposing end 34 of the bar 24. Each hook 26 is positioned to insert the tube 12 so that the bar 24 is coupled to and extends between the tube 12 to define the trap 22. In yet another embodiment, the bar 24 is rectangularly shaped when viewed longitudinally. In still yet another embodiment, the hooks 26 are integral to the bar 24. In still yet another embodiment, the bar 24 and the hooks 26 comprise plastic.

A sleeve 28 is coupled to and extends from the first end 14 of the tube 12. The sleeve 28 is complementary to the waste line. The sleeve 28 is configured to insert the waste line to fluidically couple the tube 12 to the waste line.

A pair of couplers 30 is coupled singly proximate to the first end 14 and the second end 16 of the tube 12. The couplers 30 are configured to selectively couple to the waste line and the tailpiece. The couplers 30 are configured to fluidically couple the tube 12 to the waste line and the tailpiece. In one embodiment, each coupler 30 comprises a hose clamp 32.

In use, the sleeve 28 that is positioned on the tube 12 is configured to insert the waste line to fluidically couple the tube 12 to the waste line. The hose clamps 32 are configured to fluidically couple the tube 12 to the waste line and the tailpiece. The tube 12 is configured to drain the waste water from the sink to the waste line. The hooks 26 are positioned on the bar 24 such that each hook 26 is positioned to insert the tube 12. The bar 24 is coupled to and extends between the tube 12 to position the trap 22 in the tube 12. The trap 22 is configured to retain liquid. The liquid is positioned to deter the passage of the gas from the waste line through the trap 22 and the tube 12 to the sink.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A flexible drain line assembly comprising:
   a tube having a first end and a second end, said first end being configured for fluidically coupling to a waste line, said second end being configured for fluidically coupling to a tailpiece of a sink such that said tube is configured for draining waste water from the sink to the waste line, said tube being flexible between said first end and said second end such that said tube is configured for positioning with said first end proximate to the waste line and said second end proximate to the tailpiece, and such that a section of said tube positioned proximate to said first end is configured for curvedly bending below the waste line; and
   a retainer, said retainer being couplable to a medial portion of said tube between said first end and said second end wherein flexible portions of said tube extend outwardly from said retainer away from said medial portion of said tube, said retainer being positioned for fixedly positioning said section of said tube defining a trap, wherein said retainer is positioned on said tube such that said trap is configured for retaining liquid such that the liquid is positioned for deterring gas from passing from the waste line through said trap and said tube to the sink.

2. The assembly of claim 1, further including said tube being circularly shaped when viewed longitudinally.

3. The assembly of claim 1, further including said tube comprising corrugated hose.

4. The assembly of claim 1, further including said tube comprising plastic.

5. The assembly of claim 1, further including said trap being U-shaped.

6. The assembly of claim 1, further including said retainer comprising:
   a bar;
   a pair of hooks, each said hooks being complementary to said tube, each said hook being coupled to and extending from a respective opposing end of said bar; and
   wherein said hooks are positioned on said bar such that each said hook is positioned for inserting said tube such that said bar is coupled to and extends between said tube defining said trap.

7. The assembly of claim 6, further including said bar being rectangularly shaped when viewed longitudinally.

8. The assembly of claim 6, further including said hooks being integral to said bar.

9. The assembly of claim 6, further including said bar and said hooks comprising plastic.

10. The assembly of claim 1, further including a sleeve coupled to and extending from said first end of said tube, said sleeve being complementary to the waste line, wherein said sleeve is positioned on said tube such that said sleeve is configured for inserting the waste line for fluidically coupling the tube to the waste line.

11. The assembly of claim 1, further including a pair of couplers, said couplers being coupled singly proximate to said first end and said second end of said tube, said couplers being configured for selectively coupling to the waste line and the tailpiece, wherein said couplers are positioned on said tube such that said couplers are configured for fluidically coupling said tube to the waste line and the tailpiece.

12. The assembly of claim 11, further including each said coupler comprising a hose clamp.

13. A flexible drain line assembly comprising:
   a tube having a first end and a second end, said first end being configured for fluidically coupling to a waste line, said second end being configured for fluidically coupling to a tailpiece of a sink such that said tube is configured for draining waste water from the sink to the waste line, said tube being flexible between said first end and said second end such that said tube is configured for positioning with said first end proximate to the waste line and said second end proximate to the tailpiece, and such that a section of said tube positioned proximate to said first end is configured for curvedly bending below the waste line, said tube being circularly shaped when viewed longitudinally, said tube comprising corrugated hose, said tube comprising plastic;
   a retainer, said retainer being couplable to a medial portion of said tube between said first end and said second end wherein flexible portions of said tube extend outwardly from said retainer away from said medial portion of said tube, said retainer being positioned for fixedly positioning said section of said tube defining a trap, wherein said retainer is positioned on said tube such that said trap is configured for retaining liquid such that the liquid is positioned for deterring gas from passing from the waste line through said trap and said tube to the sink, said trap being U-shaped, said retainer comprising:
      a bar, said bar being rectangularly shaped when viewed longitudinally, a pair of hooks, each said hooks being complementary to said tube, each said hook being coupled to and extending from a respective opposing end of said bar, and wherein said hooks are positioned on said bar such that each said hook is positioned for inserting said tube such that said bar is coupled to and extends between said tube defining said trap, said hooks being integral to said bar, said bar and said hooks comprising plastic;

a sleeve coupled to and extending from said first end of said tube, said sleeve being complementary to the waste line, wherein said sleeve is positioned on said tube such that said sleeve is configured for inserting the waste line for fluidically coupling the tube to the waste line;

a pair of couplers, said couplers being coupled singly proximate to said first end and said second end of said tube, said couplers being configured for selectively coupling to the waste line and the tailpiece, wherein said couplers are positioned on said tube such that said couplers are configured for fluidically coupling said tube to the waste line and the tailpiece, each said coupler comprising a hose clamp; and wherein said sleeve is positioned on said tube such that said sleeve is configured for inserting the waste line for fluidically coupling the tube to the waste line, wherein said hose clamps are positioned on said tube such that said hose clamps are configured for fluidically coupling said tube to the waste line and the tailpiece such that said tube is configured for draining the waste water from the sink to the waste line, wherein said hooks are positioned on said bar such that each said hook is positioned for inserting said tube such that said bar is coupled to and extends between said tube positioning said trap in said tube such that said trap is configured for retaining liquid such that the liquid is positioned for deterring the gas from passing from the waste line through said trap and said tube to the sink.

* * * * *